（12）United States Patent
Popov et al.

(10) Patent No.: US 8,398,951 B2
(45) Date of Patent: Mar. 19, 2013

(54) POLYPYRROLE AND SILVER VANADIUM OXIDE COMPOSITE (75) Inventors: Branko N. Popov, Columbia, SC (US); Jong-Won Lee, Columbia, SC (US)

(73) Assignee: University of South Carolina, Columbia, SC (US)

( * ) Notice: Subject to any disclaimer, the term of this patent is extended or adjusted under 35 U.S.C. 154(b) by 0 days.

(21) Appl. No.: 13/411,976

(22) Filed: Mar. 5, 2012

(65) Prior Publication Data

US 2012/0168687 A1 Jul. 5, 2012

Related U.S. Application Data (62) Division of application No. 12/090,292, filed as application No. PCT/US2006/040516 on Oct. 17, 2006, now Pat. No. 8,133,611.

(60) Provisional application No. 60/727,686, filed on Oct. 17, 2005, provisional application No. 60/760,847, filed on Jan. 20, 2006.

(51) Int. Cl.
H01M 4/02 (2006.01)
(52) U.S. Cl. .................. 423/523; 423/209
(58) Field of Classification Search .......... 252/500, 252/506, 520.3, 520.4; 429/482, 523, 209
See application file for complete search history.

(56) References Cited

U.S. PATENT DOCUMENTS

| 5,474,858 | A | 12/1995 | Merritt |
| 6,673,493 | B2 | 1/2004 | Gan et al. |
| 7,651,647 | B1 * | 1/2010 | Strange et al. ............... 264/104 |
| 2003/0104270 | A1 | 6/2003 | Rubino et al. |
| 2004/0185346 | A1 | 9/2004 | Takeuchi et al. |

FOREIGN PATENT DOCUMENTS

EP 1460700 * 9/2004

OTHER PUBLICATIONS

Kuwabata et al "Charge-discharge properties of chemically prepared composites of V2O5 and polypyrrole . . . ", Electrochem Acta 46 (2000) 91-97.*
Search Report from PCT/US2006/40516, mailed Oct. 2, 2007—3 pages.
Kuwabata et al., "Charge-Discharge Properties of Chemically Prepared Composites of $V_2O_5$ and Polypyrrole as Positive Electrode Materials in Rechargeable Li Batteries", Electrochimica Acta, vol. 46, Issue 1, Oct. 2000, pp. 91-97.
Lee et al., "Electrochemical Intercalation of Lithium into Polypyrrole/Silver Vanadium Oxide Composite Used for Lithium Primary Batteries", Journal of Power Sources, vol. 161, Issue 1, Oct. 2006, pp. 565-572.

* cited by examiner

*Primary Examiner* — Mark Kopec
(74) *Attorney, Agent, or Firm* — Dority & Manning, P.A.

(57) ABSTRACT

In one embodiment of the present disclosure, a composite electrode for a battery is provided. The composite electrode includes silver vanadium oxide present in an amount from about 75 weight percent to about 99 weight percent and polypyrrole present in an amount from about 1 weight percent to about 25 weight percent.

9 Claims, 11 Drawing Sheets

POLYPYRROLE AND SILVER VANADIUM OXIDE COMPOSITE

CROSS REFERENCE TO RELATED APPLICATIONS

This application is a divisional of U.S. application Ser. No. 12/090,292 (filed Sep. 29, 2008, now U.S. Pat. No. 8,133,611), which application is a 371 of PCT/US2006/040516 having a filing date of Oct. 17, 2006. This application is also based on and claims priority to U.S. Provisional Application Ser. No. 60/727,686 having a filing date of Oct. 17, 2005, and U.S. Provisional Application Ser. No. 60/760,847 having a filing date of Jan. 20, 2006.

BACKGROUND

Silver vanadium oxide (SVO), $Ag_2V_4O_{11}$, shows high gravimetric and volumetric energy densities. When SVO is used as a positive electrode in batteries in implantable medical devices, it performs most of the time at low power and occasionally delivers one or more high power pulses. SVO provides an electrode potential curve with multiple plateaus, which allows one to accurately predict the lifetime of the battery.

The synthesis methods of SVO are divided broadly into two categories—decomposition and combination reaction methods. The former method uses decomposable silver compounds accompanied by the evolution of toxic $NO_x$ gas during heat-treatment. In the combination reaction method, silver oxide $Ag_2O$ reacts at high temperature with vanadium pentoxide $V_2O_5$ in 1:2 molar ratio without liberating any gaseous products. The combination reaction leads to a well-crystallized SVO with higher surface area, when compared with the material synthesized using the decomposition reaction.

While the theoretical discharge capacity characteristics of SVO are quite high, much lower utilization of SVO is typically attained, especially at high discharge rates due to high particle-to-particle resistance and electrical resistivity of SVO. The internal cell resistance increases with progressing discharge, resulting in a poor power capability in Lithium/SVO cells. While attempts have been made to improve the electrochemical performance of the SVO electrodes by optimizing the synthesis process and by introduction of substitution atoms, a need exists enhanced discharge capacity and rate capability.

SUMMARY

The present disclosure recognizes and addresses the foregoing needs as well as others. Objects and advantages of the invention will be set forth in part in the following description, or may be obvious from the description, or may be learned through the practice of the invention. In one embodiment of the present disclosure, a composite electrode for a battery is provided. The composite electrode includes silver vanadium oxide present in an amount from about 75 weight percent to about 99 weight percent and polypyrrole present in an amount from about 1 weight percent to about 25 weight percent.

In certain embodiments, the polypyrrole may be present in an amount from about 5 weight percent to about 15 weight percent. In some embodiments, the polypyrrole may be present in an amount from about 7 weight percent to about 12 weight percent. In certain embodiments, said electrode may be located in a lithium battery. In such embodiments, the battery may have a discharge capacity from about 255 mAh g-1 to about 315 mAh g-1. In certain embodiments, the battery may have a discharge capacity from about 275 mAh g-1 to about 310 mAh g-1. In certain embodiments, the battery may have a discharge capacity from about 285 mAh g-1 to about 305 mAh g-1. In some embodiments, the electrode may include the cathode of the battery. In certain embodiments, the battery may be used in a medical device. In some embodiments, the electrode may include carbon.

In another embodiment of the present disclosure, a process for synthesis by oxidative polymerization is provided. The process includes contacting silver vanadium oxide with an acidic solution to form a solution containing silver vanadium oxide and contacting pyrrole with the solution containing silver vanadium oxide to form a composite material including polypyrrole and silver vanadium oxide.

Other features and aspects of the present disclosure are discussed in greater detail below.

DESCRIPTION OF THE DRAWINGS

A full and enabling disclosure, including the best mode thereof to one of ordinary skill in the art, is set forth more particularly in the remainder of the specification, including reference to the accompanying figures in which:

FIG. 4 illustrates (a) Galvanostatic discharge curves at the rate of C/25 and (b) specific discharge capacities as a function of the discharge rate, obtained for SVO(N), SVO(A) and 7 wt % PPy/SVO(A), with the specific discharge capacity calculated based on the weight of active material;

FIG. 5 illustrates (a) theoretical and experimental discharge capacities of PPy/SVO(A) and (b) utilization of SVO (A) in PPy/SVO(A) as a function of the PPy content, with the full utilization of PPy assumed with a capacity of 72 mAh g$^{-1}$;

DETAILED DESCRIPTION

It is to be understood by one of ordinary skill in the art that the present discussion is a description of exemplary embodiments only, and is not intended as limiting the broader aspects of the present disclosure, which broader aspects are embodied in the exemplary construction.

The present disclosure is generally directed to a composite electrode and a process for making the same. In accordance with certain aspects of the present disclosure, a novel process of synthesizing a polypyrrole (PPy) and silver vanadium oxide (SVO) composite material is described. Such a process allows for an increase in the discharge capacity and improvement in the rate capability of an SVO electrode. The PPy/SVO composite electrodes are prepared by an oxidative polymerization of pyrrole monomer on the SVO surface in acidic solution.

Typically, the discharge capacity of a Li/SVO cell is much lower than the theoretical value, especially at high discharge rates, due to high particle-to-particle resistance and electrical resistivity of SVO. Since PPy possesses its own capacity to intercalate ions, and also promotes insertion into SVO, the PPy/SVO composite electrode yields higher discharge capacity than a pristine SVO electrode. Furthermore, PPy has a high electrical conductivity, so it greatly reduces the internal cell resistance, thus enhancing the power capability of electrochemical cell.

In accordance with the present disclosure, a process for synthesis of a composite material by oxidative polymerization is described. The process includes contacting SVO with an acidic solution to form a solution containing SVO. The process further includes contacting pyrrole with the solution containing SVO to form a composite material which includes PPy and SVO.

In certain embodiments, SVO can be prepared by using a combination reaction of $Ag_2O$ and $V_2O_5$ to form an SVO powder. However, other suitable methods to form SVO can also be utilized including decomposition reactions if so desired.

The acidic solution utilized to contact the SVO can be selected from various acid solutions as would be known to one of skill in the art. In certain embodiments of the present disclosure, $HClO_4$ solution can be utilized as the acidic solution.

In some embodiments, after the SVO is contacted with an acidic solution, the solution containing SVO is contacted with nitrogen gas or similarly suitable material. In some embodiments, such a gas is bubbled through the solution for a period of time.

As stated previously, the process further includes contacting pyrrole with the solution containing SVO to form a composite material which includes PPy and SVO. In certain embodiments, various concentrations of pyrrole can be injected into the SVO containing solution. In some embodiments, liquid pyrrole (98%, Aldrich) can be utilized. However, suitable pyrrole as would be known to one skilled in the art can be utilized as well.

In some embodiments, the pyrrole is injected into the SVO solution during vigorous magnetic stirring. However, other suitable methods of agitating the solution may also be employed.

The process of the present disclosure can optionally include filtering the polypyrrole and silver vanadium composite material and rinsing and drying the same. In such embodiments, the composite powders can be collected by filtration and rinsed first with a 1 M $HClO_4$ solution and then with deionized water, followed by drying under vacuum or other suitable drying method.

In accordance with one embodiment of the present disclosure, a composite electrode for a battery is provided. Such an electrode can be created utilizing the process described herein. The electrode includes silver vanadium oxide and polypyrrole.

A suitable carbon material may also be utilized in forming the electrode. Carbon black is a carbon typical of those used for electrodes in batteries. However, other carbon-containing materials can be utilized as would be known in the art including but not limited to activated carbon and carbon nanotubes.

The silver vanadium oxide can be present in an amount from about 75 weight percent to about 99 weight percent. The polypyrrole can be present in an amount from about 1 weight percent to about 25 weight percent.

In certain embodiments, the polypyrrole is present in an amount from about 5 weight percent to about 15 weight percent. In some embodiments, the polypyrrole is present in an amount from about 7 weight percent to about 12 weight percent.

The electrode of the present disclosure can be located in a lithium battery such as a lithium primary battery. However, the electrode may also be utilized in other types of batteries as would be known to one of ordinary skill in the art.

A battery with an electrode contemplated by the present disclosure can have a discharge capacity from about 255 mAh g-1 to about 315 mAh g-1. In certain embodiments, the battery can have a discharge capacity from about 275 mAh g-1 to about 310 mAh g-1. In certain embodiments, the battery can have a discharge capacity from about 285 mAh g-1 to about 305 mAh g-1.

The electrode of the present disclosure can be can be utilized as a cathode in a lithium/silver vanadium oxide primary battery. Such a battery could be utilized for various applications, including medical devices. In such medical devices, accurate prediction of the lifetime of the battery is of importance, and the electrode of the present disclosure is advantageous in that regard. Suitable medical devices include implantable cardio-verter defibrillators or other devices in which a battery containing an electrode of the present disclosure would be of benefit The following examples are provided to illustrate the present invention and is not intended to limit the scope of the invention.

EXAMPLES

Preparation of PPy/SVO Composites

SVO was prepared by using a combination reaction of $Ag_2O$ and $V_2O_5$. A mixture of $Ag_2O$ (99+%, Alfa Aesar) and $V_2O_5$ (99.995%, Alfa Aesar) in 1:2 molar ratio was heat-treated in either $N_2$ or air at 520° C. for 24 h. As-heat-treated sample with a dark brown color was then pulverized by grinding into fine powders. The SVO powder specimens synthesized in $N_2$ and air are denoted as SVO(N) and SVO(A), respectively.

The composite specimens of PPy and SVO were chemically synthesized by an oxidative polymerization of pyrrole monomer on the SVO surface as follows: the SVO(A) powders prepared in an air atmosphere were dispersed in a 1 M $HClO_4$ solution, followed by bubbling with $N_2$ for 30 minutes. Various concentrations of liquid pyrrole (98%, Aldrich) were then slowly injected into the SVO(A)-containing solution during vigorous magnetic stirring. The resulting PPy/SVO(A) composite powders with a black color were collected by filtration and were thoroughly rinsed first with a 1 M $HClO_4$ solution and then with deionized water, followed by drying under vacuum at 80° C. for 12 hours.

Materials Characterizations

In order to identify the crystal structures of the synthesized powder specimens, X-ray diffraction (XRD) patterns were recorded with an automated Rigaku diffractometer using Cu $K_\alpha$ radiation over the scanning angle range of 10 to 60° at the scan rate of 4° $min^{-1}$. Fourier transform-infrared (FT-IR) spectra were performed on pellets by using a Nicolet 4700 FT-IR spectrometer under transmittance mode. Thermogravimetric analysis (TGA) was conducted to determine the PPy content in composite using a Perkin-Elmer TGA7 thermogravimetric analyzer. The powder specimens were heated in a helium flow from room temperature to 500° C. at the scan rate of 5° C. min$^{-1}$.

Electrochemical Experiments

The active material powders were mixed with 5 wt % carbon black (acetylene, 99.9%, Alfa Aesar) and 5 wt % polytetrafluoroethylene (PTFE, Aldrich) to prepare a pellet with a diameter of 1 cm. A three-electrode electrochemical cell was employed for the electrochemical experiments. Both the reference and counter electrodes were constructed from lithium foil (electrochemical grade, FMC Corporation), and 1 M LiPF$_6$-DME/PC (50:50 vol %, Ferro Corporation) was used as the electrolyte. The assembly of cells was performed in a glove box filled with purified argon gas.

Galvanostatic discharge experiments were carried out with an Arbin BT-2043 battery test station at various current densities with the cut-off potential being 1.5 V vs. Li/Li$^+$. Chronoamperometric technique and electrochemical impedance spectroscopy (EIS) were performed using an EG&G PAR model 273 potentiostat combined with a Solartron 1255 frequency response analyzer. Chronoamperometric and impedance measurements were run by applying a potential drop of 25 mV and by applying an ac-amplitude of 5 mV peak-to-peak over the frequency range from 10 mHz to 100 kHz, respectively.

Characterizations of PPy/SVO Composite Electrodes

Figure 1:
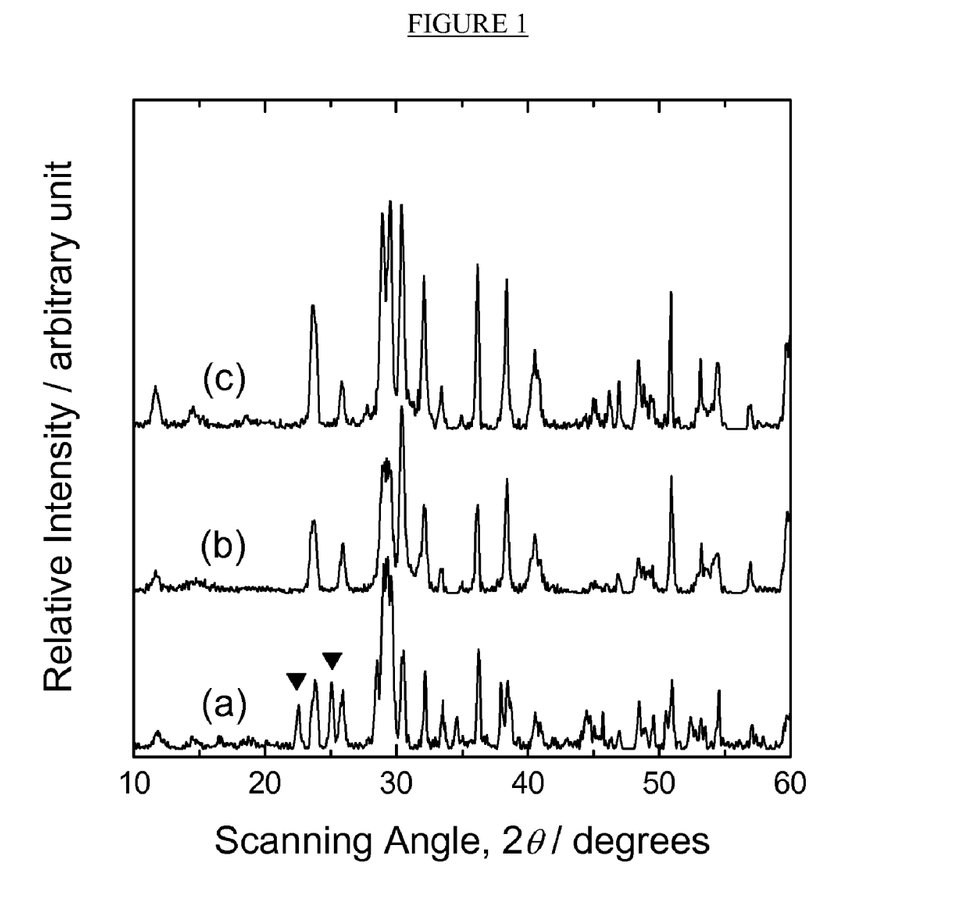
FIG. 1 illustrates XRD patterns of (a) SVO(N), (b) SVO(A) and (c) PPy/SVO(A) powder specimens, with the arrows in FIG. 1(a) representing the peaks due to the $Ag_{1.2}V_3O_8$ phase.

FIG. 1 (a)-(c) present powder XRD patterns of pristine SVO(N), SVO(A) and PPy/SVO(A) composite, respectively. When compared with the XRD pattern for SVO(A), the pattern for SVO(N) shows two additional peaks at about 22.6° and 25.1° both of which are attributed to the non-stoichiometric Ag$_{1.2}$V$_3$O$_8$ phase. On the basis of a ternary phase diagram for Ag$_2$O—V$_2$O$_5$—V$_2$O$_4$, the appearance of Ag$_{1.2}$V$_3$O$_8$ phase in SVO(N) can be explained by a 'sprouting phenomenon' which refers to the phase transformation of Ag$_2$V$_4$O$_{11-y}$ to Ag$_{1.2}$V$_3$O$_8$ during heat-treatment in an inert atmosphere.

Since the extra electrons of the double bond in a conjugated system are free to move through the polymer chain, PPy is an inherent conducting polymer. However, in order to have a high electrical conductivity it should exist in the oxidized form. During the polymerization process, the SVO(A) surface should be negatively charged to compensate the positive charges developed on the oxidized form of PPy. Thus, it is expected that the formation of V$^{4+}$ species on the SVO(A) surface accompanies the oxidative polymerization of pyrrole monomer in an acidic HClO$_4$ solution. Since the XRD pattern of PPy/SVO(A) composite is exactly the same as that of pristine SVO(A), the results indicate that a small amount of V$^{4+}$ species does not induce any significant structural modification of SVO(A) during the polymerization process.

Figure 2:
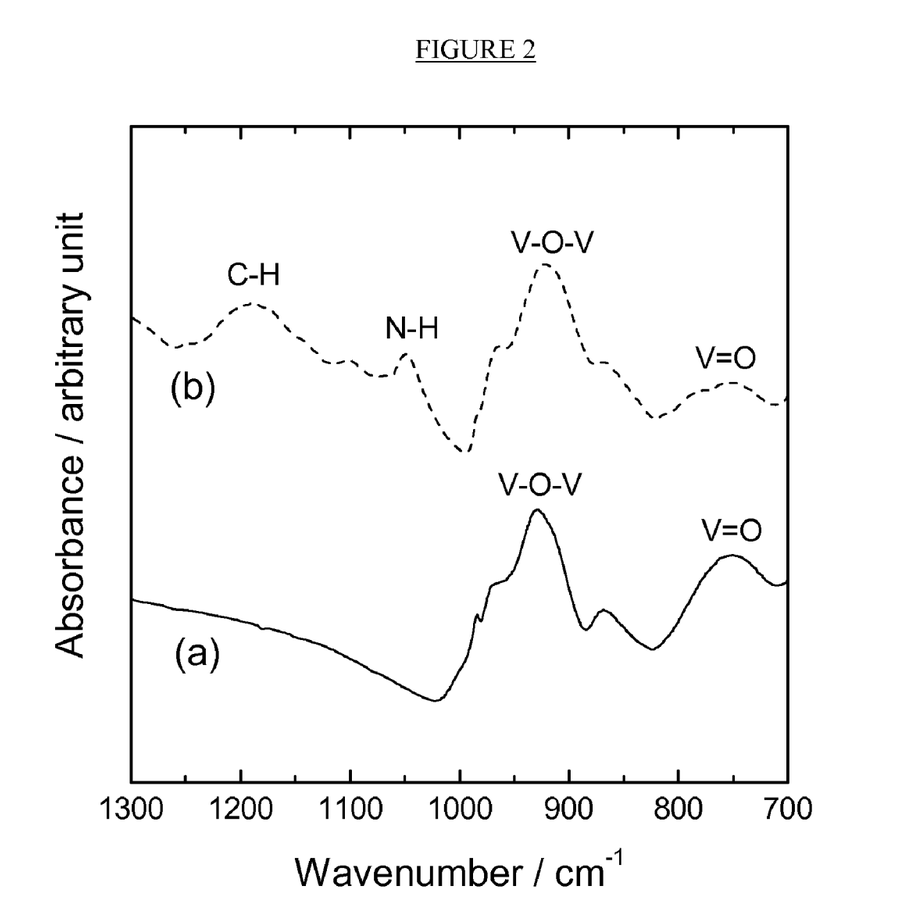
FIG. 2 illustrates FT-IR spectra measured on the KBr-diluted pellets of (a) SVO(A) and (b) PPy/SVO(A)

FIGS. 2 (a) and (b) show the FT-IR spectra obtained for the KBr-diluted pellets of pristine SVO(A) and PPy/SVO(A) composite, respectively. In both spectra, the characteristic absorption bands of the V—O—V and V═O vibrations are observed at approximately 750 and 925 cm$^{-1}$, respectively. In addition, the FT-IR spectrum of PPy/SVO(A) composite exhibits two absorption bands around 1050 and 1190 cm$^{-1}$ which can be assigned to the N—H and C—H in-plane vibrations in PPy, respectively. This result confirms that SVO can be successfully used as an oxidizing agent to polymerize pyrrole monomer on its surface in an acidic HClO$_4$ solution, leading to the PPy/SVO composite electrode.

Figure 3:
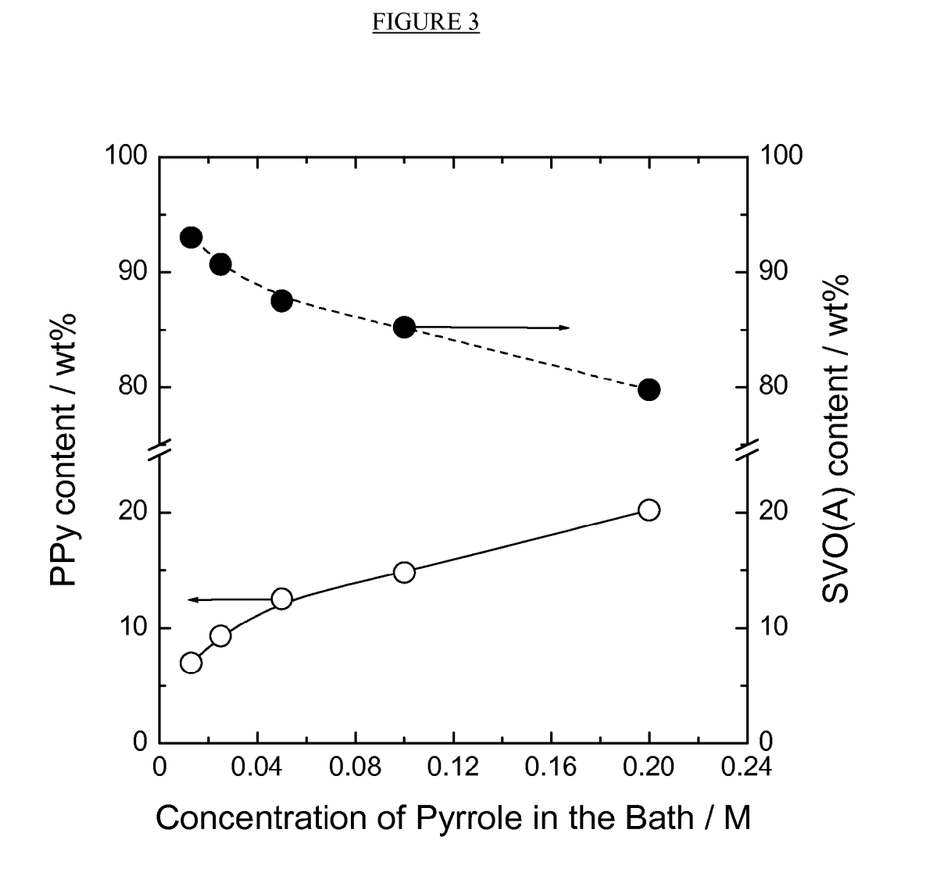
FIG. 3 illustrates plots of the PPy and SVO(A) contents in the composite electrode against the liquid pyrrole concentration in the polymerization bath determined by TGA.

The PPy content in the PPy/SVO(A) composite electrode was determined by estimating the weight loss of the composite material during a temperature scan carried out from room temperature to 500° C. in a helium flow. The PPy was found to completely decompose at approximately 420° C., which agrees well with our previous finding on PPy/Co$_{0.2}$CrO$_x$, composites. FIG. 3 shows the amounts of PPy and SVO(A) in the composite electrode as a function of the liquid pyrrole concentration injected into the polymerization bath. As the concentration of pyrrole monomer increases to 0.2 M, the PPy content gradually increases up to 20.2 wt %. The composite electrodes with 0-15 wt % PPy were subjected to extensive electrochemical characterization studies.

Electrochemical Performances of PPy/SVO Composite Electrodes

Figure 4A:
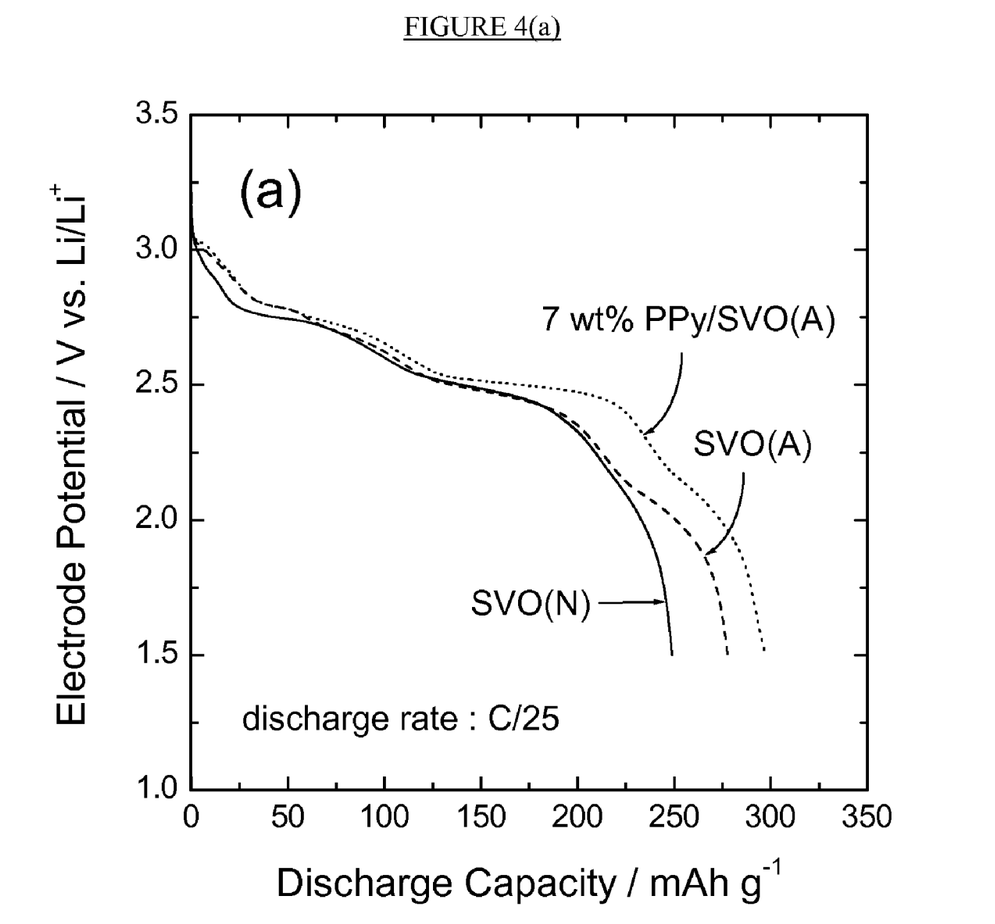
Figure 4B:
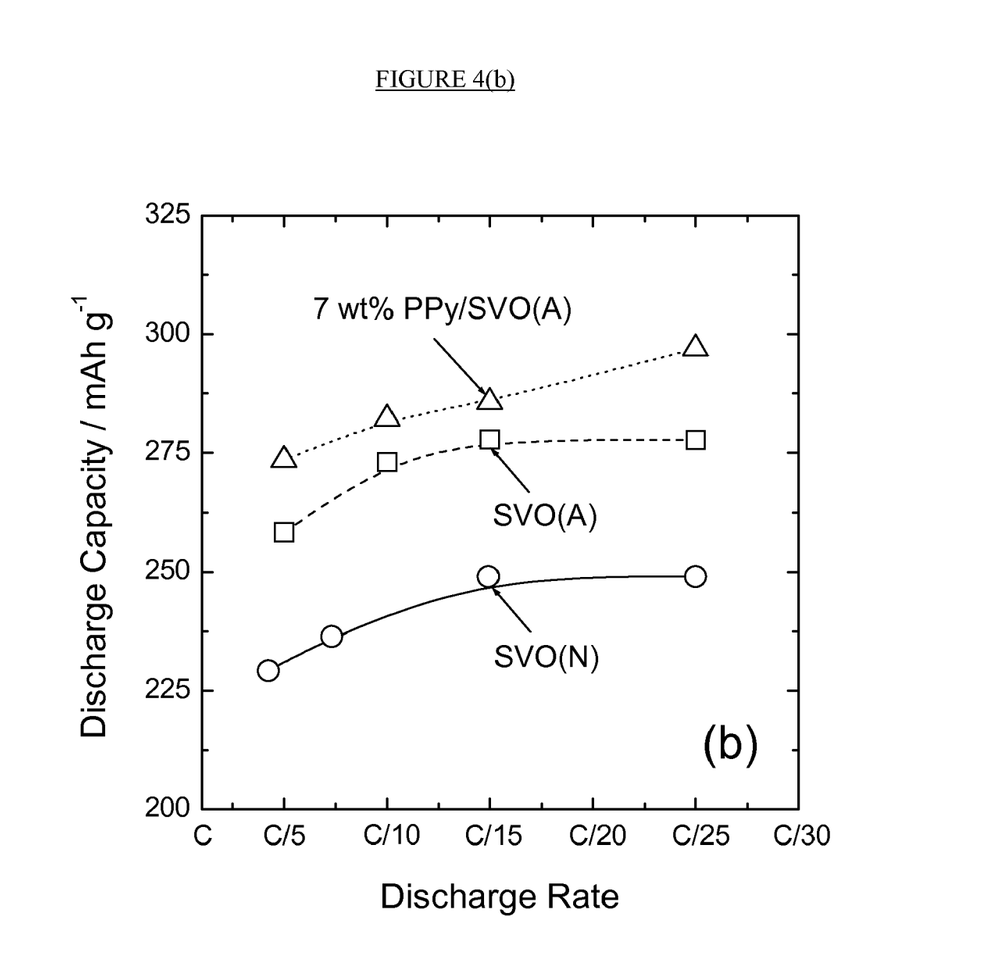

FIGS. 4 (a) and (b) present the galvanostatic discharge curves obtained at C/25 rate and the discharge capacity vs. rate dependence, respectively. The discharge curves were recorded on three types of electrodes: pristine SVO(N), SVO (A) and 7 wt % PPy/SVO(A) composite electrode. The value of the specific discharge capacity was calculated based on the weight of the active material rather than the weight of pellet with conductive carbon and organic binder.

The results presented in FIGS. 4 (a) and (b) indicate that three distinct potential plateaus are observed at 2.8, 2.5 and 2.1 V vs. Li/Li$^+$. The observed plateaus correspond to the reduction reactions of (i) Ag$^+$ to Ag, (ii) V$^{5+}$ to V$^{4+}$ (and V$^{4+}$ to V$^{3+}$) and (iii) V$^{4+}$ to V$^{3+}$, respectively. The discharge capacity determined at the cut-off potential of 1.5 V vs. Li/Li$^+$ increases in the order of pristine SVO(N), SVO(A) and PPy/SVO(A) composite. Since only four moles of lithium can be electrochemically intercalated into Ag$_{1.2}$V$_3$O$_8$, a lower discharge capacity of the pristine SVO(N) electrode we believe is attributable to the presence of Ag$_{1.2}$V$_3$O$_8$ phase which is confirmed by the XRD pattern in FIG. 1 (a). The PPy/SVO(A) composite electrode shows the highest discharge capacity of ca. 297 mAh g$^{-1}$. As shown in FIG. 4 (a), the second potential plateau of PPy/SVO(A) composite is larger when compared to that of pristine SVO(A), which indicates that PPy contributes mainly to an increase in the discharge capacity of the composite electrode at approximately 2.5 V vs. Li/Li$^+$. It is also of importance to note that the improvement in the discharge capacity of PPy/SVO(A) composite as shown in FIG. 4 (b) remains over a wide range of discharge rates, indicating an enhanced rate capability of the composite material.

Figure 5A:
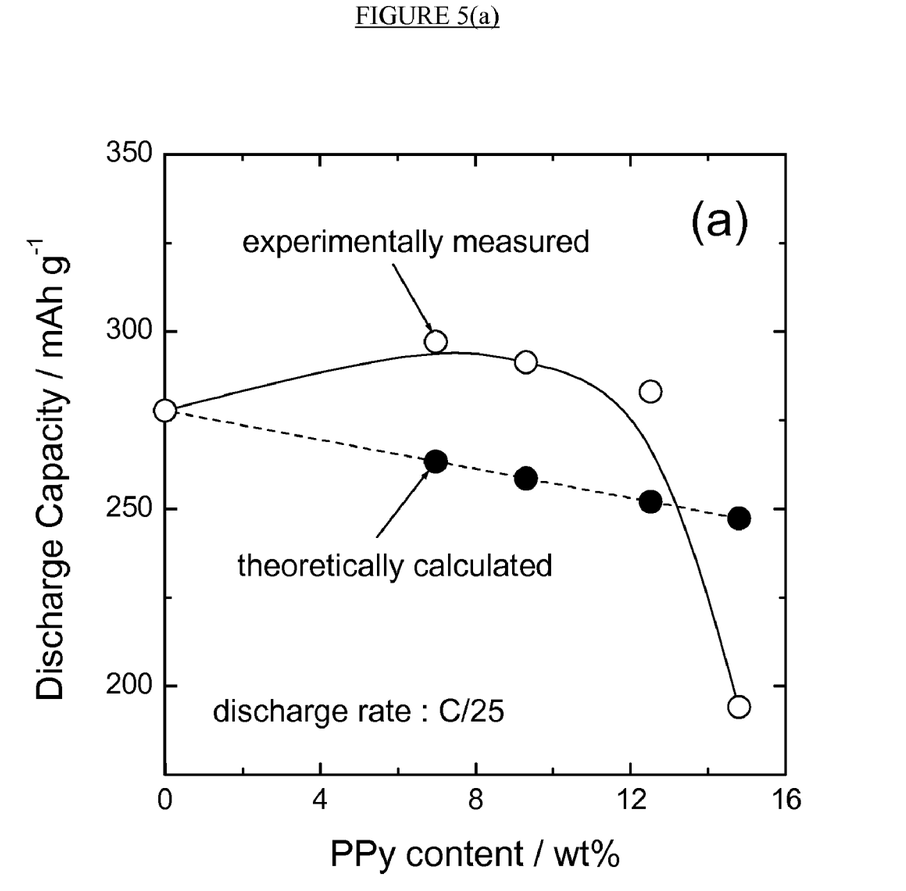

FIG. 5 (a) presents the discharge capacities of the PPy/SVO(A) composite electrodes which contain various PPy contents. For comparison, the theoretical dependence of the discharge capacity on the PPy content is also presented in FIG. 5 (a). Besides the fact that bare PPy is known to be electrochemically active for lithium intercalation, it typically has much lower capacity of ca. 72 mAh g$^{-1}$ than the bare SVO, and hence the theoretical discharge capacity of PPy/SVO(A) composite should decrease linearly with increasing PPy content. However, the galvanostatic discharge data in FIG. 5 (a) clearly show that the discharge capacity of PPy reaches a maximum for PPy content between about 7.0 and 12.5 wt %.

The composite electrode yields higher discharge capacity than the pristine SVO(A) electrode. In case of PPy/SVO(A) composite, the synergic electrochemical performance exceeds the sum of PPy and SVO(A)'s individual performances indicating that besides the fact that PPy is electrochemically active (it possesses its own capacity to intercalate lithium ions), it also promotes lithium insertion into SVO(A).

Figure 5B:
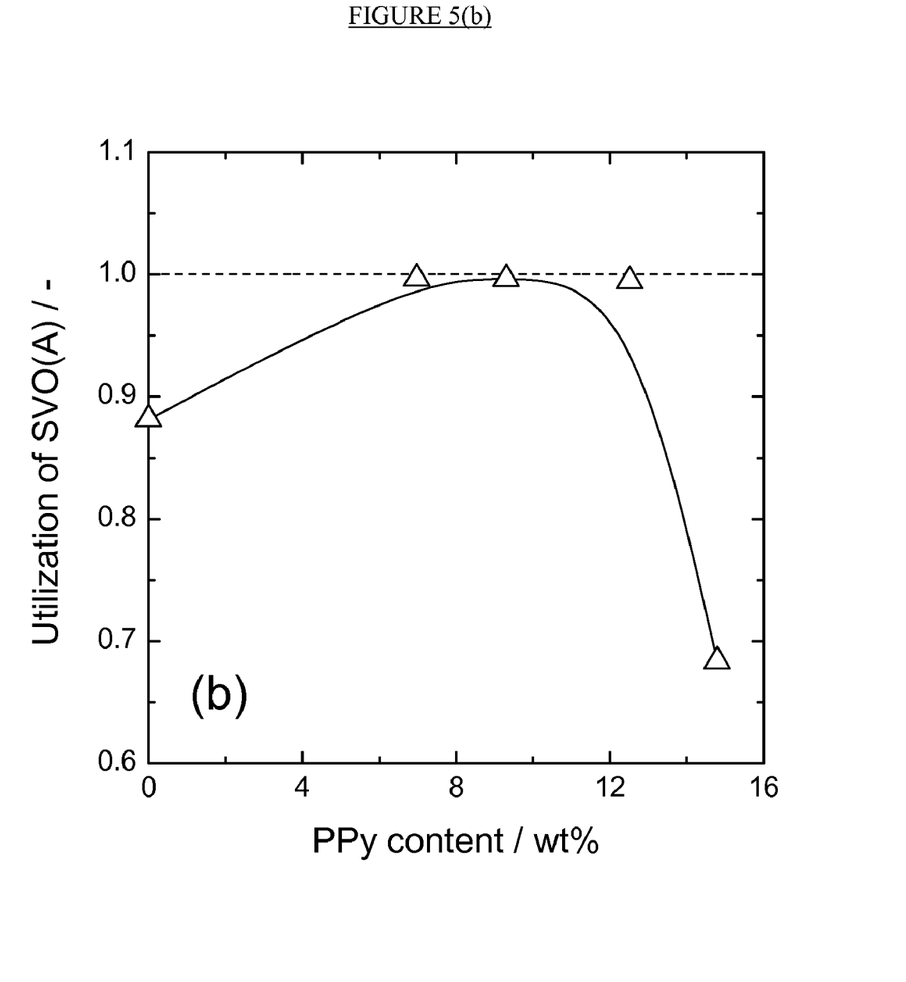

FIG. 5 (b) shows the utilization of SVO(A) in the composite electrode as a function of the PPy content. The utilization was calculated from the measured discharge capacity of PPy/SVO(A) by assuming a full utilization of PPy with a capacity of 72 mAh g$^{-1}$. The PPy content in the composite in the range of about 7.0 to 12.5 wt % causes SVO(A) to be fully utilized during the discharge process.

Kinetic Studies on Lithium Intercalation into PPy/SVO Composite Electrodes

Chronoamperometry (potentiostatic current transient technique) was used to estimate the rate-determining steps which control the lithium intercalation. If lithium intercalation is controlled by diffusion within the bulk of the electrode, the relationship between the current I and time t is given by Cottrell equation:

$$I(t) = \frac{Q\sqrt{\tilde{D}_{Li}}}{L\sqrt{\pi}} t^{-\frac{1}{2}} \text{ for } t << \frac{L^2}{\tilde{D}_{Li}} \quad (1)$$

where Q is the total charge transferred over the whole lithium intercalation, $\tilde{D}_{Li}$ is the chemical diffusivity of lithium while L denotes the diffusion length. According to Eq. (1), the Cottrell region is characterized by a plateau in the It$^{1/2}$ vs. log t plot (Cottrell plot). Therefore, the Cottrell plot can provide a diagnostic tool for identifying the intercalation behavior of lithium.

Figure 6:
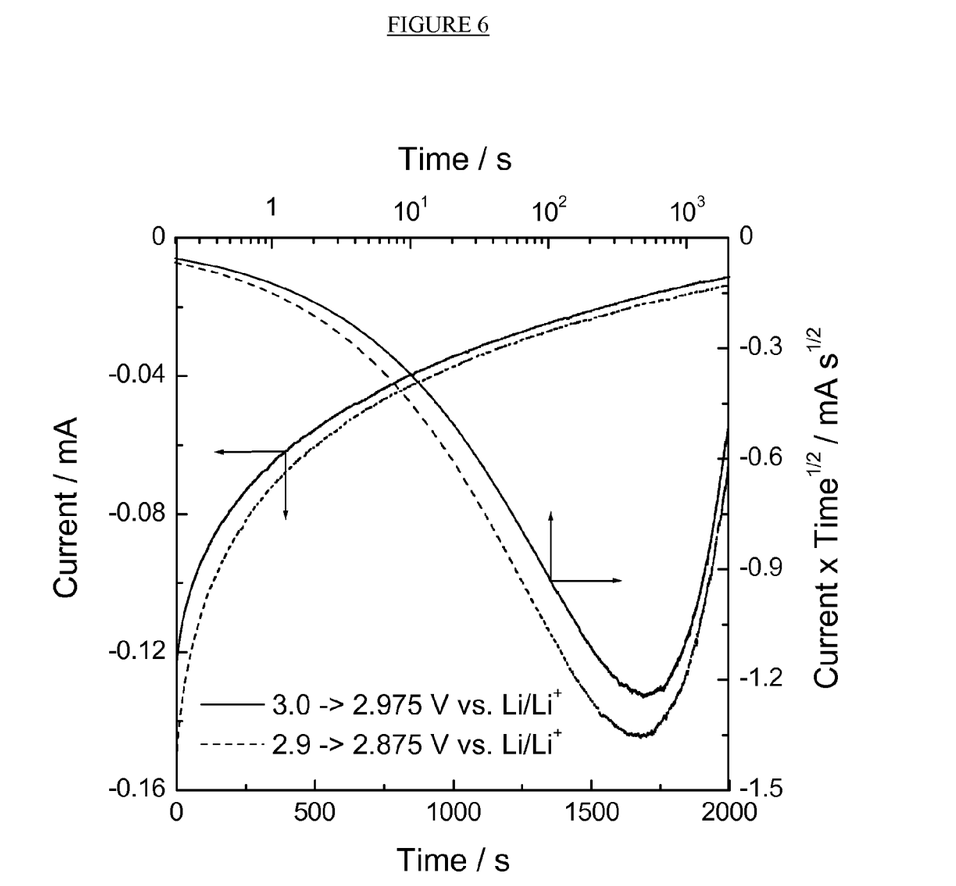
FIG. 6 illustrates typical current responses of 7 wt % PPy/SVO(A) to different potential steps.

FIG. 6 presents typical chronoamperometric curves obtained for 7 wt % PPy/SVO(A) composite electrode. The experiments were performed by shifting the applied potential from 3.0 to 2.975 V vs. Li/Li$^+$ and from 2.9 to 2.875 V vs. Li/Li$^+$. The corresponding Cottrell plots were constructed from the chronoamperometric curves. Since any plateau region is absent throughout the entire intercalation time, one can conclude a non-diffusion-controlled process of lithium intercalation. The non-Cottrell behavior in FIG. 6 suggests that lithium intercalation into the PPy/SVO(A) composite electrode is not controlled by diffusion alone, but rather it proceeds under the mixed control by the interfacial charge transfer and diffusion reactions.

In view of the mixed control process, the useful information that helps to understand the enhanced SVO(A) utilization in the composite electrode can be acquired by analyzing two kinetic parameters, namely the charge transfer resistance and the lithium diffusivity.

Figure 7:
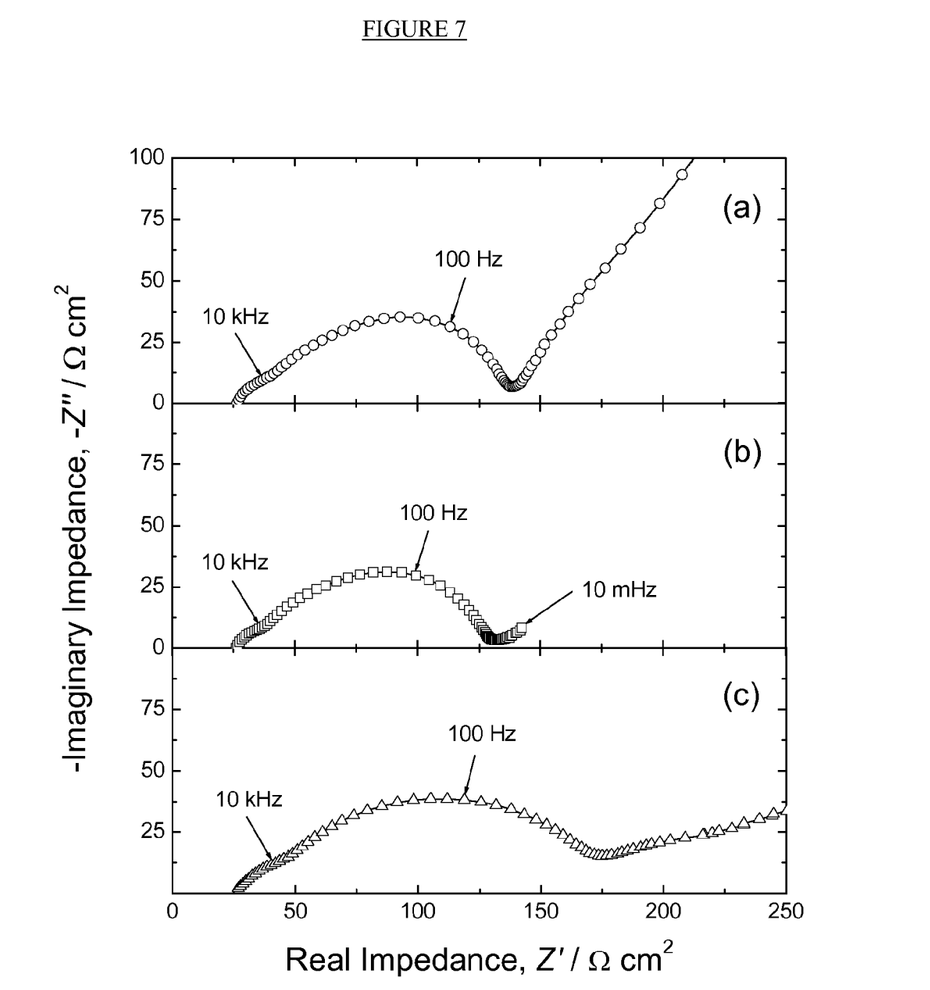
FIG. 7 illustrates Nyquist plots of the ac-impedance spectrum for 7 wt % PPy/SVO(A) at different electrode potentials: (a) 3.4 V vs. Li/Li$^+$, (b) 2.8 V vs. Li/Li$^+$ and (c) 2.0 V vs. Li/Li$^+$.

FIG. 7 (*a*)-(*c*) demonstrate typical Nyquist plots of the ac-impedance spectrum obtained for 7 wt % PPy/SVO(A) composite electrode. The electrode was polarized at 3.4, 2.8 and 2.0 V vs. Li/Li$^+$, respectively. Each of the ac-impedance spectra consists of two separated arcs in the high frequency range and a straight line inclined at constant angle to the real axis in the low frequency range. The magnitude of the first arc is almost independent of the electrode potential, while the second arc shows a strong potential-dependence. Various models have been proposed to explain such a two-arc behavior of the ac-impedance in intercalation compounds. It is generally accepted that the first arc is mainly caused by the formation of the passive film on the surface of the oxide particle, and the second arc is ascribed to the interfacial charge transfer reaction.

A straight line at low frequencies is associated with semi-infinite diffusion of lithium in the electrode (Warburg impedance). The ideal diffusion impedance should exhibit the phase angle of about 45°; however, according to FIG. 7, the absolute value of the phase angle for the measured diffusion impedance is higher than 45° at 3.4 V vs. Li/Li$^+$, and it decreases to values lower than 45° with decreasing electrode potential. The decreasing tendency of the absolute phase angle with lowering electrode potential has been also observed for V$_2$O$_5$.

The anomalous behaviors of diffusion impedance with absolute phase angles greater and lower than 45° can be explained in terms of the particle size (diffusion length) distribution and of the activation energy distribution for diffusion through the electrode, respectively. The abnormal behaviors of diffusion impedance lie beyond the scope of this work.

Figure 8:
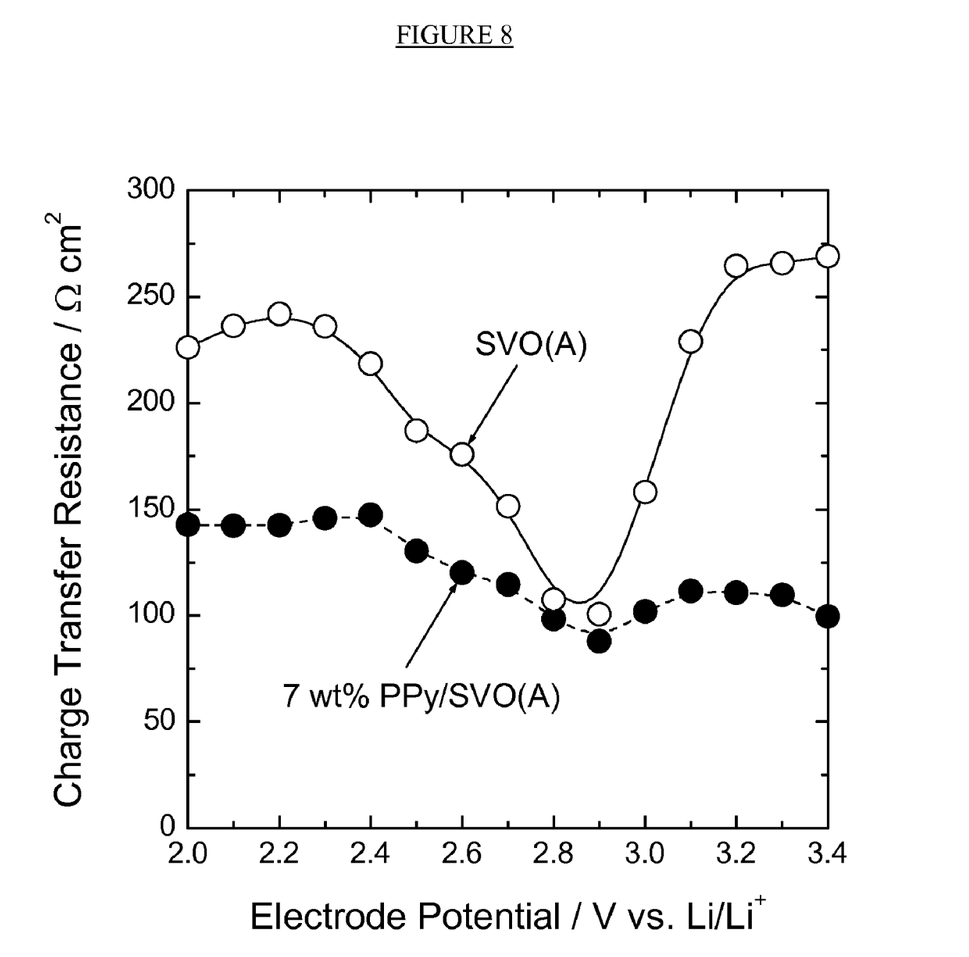
FIG. 8 illustrates plots of the charge transfer resistance against the electrode potential, obtained for SVO(A) and 7 wt % PPy/SVO(A)

FIG. 8 compares the plots of the charge transfer resistance for pristine SVO(A) and for 7 wt % PPy/SVO(A) composite as a function of the electrode potential. The data were obtained by using complex nonlinear least squares (CNLS) fitting of the ac-impedance spectra. The charge transfer resistance of PPy/SVO(A) composite decreases drastically when compared to the pristine SVO(A) over the whole potential range. It is conceivable that an enhanced charge transfer kinetics results from a conductive PPy network on the SVO(A) surface.

Since the measured diffusion impedance deviates from the ideal Warburg behavior, it is difficult to exactly determine the chemical diffusivity of lithium $\tilde{D}_{Li}$ from the ac-impedance spectra. The value of $\tilde{D}_{Li}$ was alternatively evaluated from the potential transient and coulometric titration curve:

$$\tilde{D}_{Li} = \frac{4}{\pi}\left(\frac{I_{app}V_M}{FA_g}\right)\left[\frac{(dE/dx)}{(dE/d\sqrt{t})}\right] \text{ for } t << \frac{L^2}{\tilde{D}_{Li}} \quad (2)$$

where $I_{app}$ is the applied current; $V_M$ the molar volume of the electrode; F the Faraday constant; $A_g$ the superficial geometric area of the electrode; E the electrode potential and x means the lithium content in the electrode.

Figure 9:
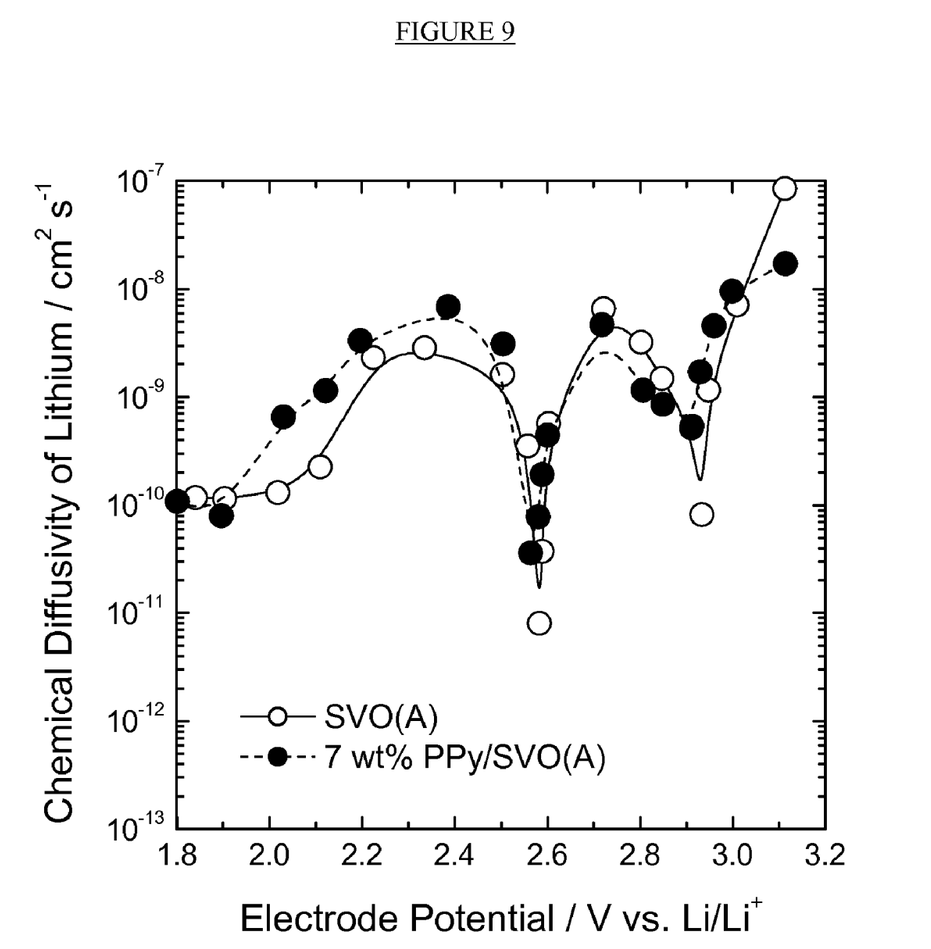
FIG. 9 illustrates plots of the chemical diffusivity of lithium in SVO(A) and 7 wt % PPy/SVO(A) with respect to the electrode potential.

The values of $\tilde{D}_{Li}$ for pristine SVO(A) and for 7 wt % PPy/SVO(A) composite are plotted in FIG. 9 as a function of the electrode potential. The plots presented in FIG. 9 indicate that $\tilde{D}_{Li}$ for both tested materials has similar dependence on the applied electrode potential showing two minima at about 2.6 and 2.9 V vs. Li/Li$^+$.

The results indicate that PPy facilitates the interfacial charge transfer kinetics by forming an effective conductive network on the SVO(A) surface and improves the utilization of the composite electrode.

CONCLUSIONS

Galvanostatic discharge experiments showed that the composite electrodes with 7.0 to 12.5 wt % PPy yield higher discharge capacity and rate capability when compared to the pristine SVO electrode. The utilization studies indicate that PPy facilitates the interfacial charge transfer and improves the utilization of the composite electrode. Chronoamperometric measurements indicate that lithium intercalation is simultaneously controlled by the interfacial charge transfer and diffusion reactions. The analyses of the ac-impedance spectra and the potential transients indicate that the charge transfer resistance is reduced by addition of PPy, while the lithium diffusivity remains nearly constant, regardless of the presence and absence of PPy. Thus, no significant influence of PPy on the diffusion kinetics of lithium was observed.

These and other modifications and variations to the present disclosure can be practiced by those of ordinary skill in the art, without departing from the spirit and scope of the present disclosure, which is more particularly set forth in the appended claims. In addition, it should be understood that aspects of the various embodiments can be interchanged both in whole or in part. Furthermore, those of ordinary skill in the art will appreciate that the foregoing description is by way of example only and is not intended to limit the disclosure so further described in such appended claims.

What is claimed:

1. A composite electrode for a battery comprising:
   silver vanadium oxide and polypyrrole;
   said silver vanadium oxide being present in an amount from about 75 weight percent to about 99 weight percent; and
   said polypyrrole being present in an amount from about 1 weight percent to about 25 weight percent, wherein said electrode is located in a lithium battery having a discharge capacity from about 255 mAh g$^{-1}$ to about 315 mAh g$^{-1}$.

2. The composite electrode of claim 1, wherein said polypyrrole is present in an amount from about 5 weight percent to about 15 weight percent.

3. The composite electrode of claim 1, wherein said polypyrrole is present in an amount from about 7 weight percent to about 12 weight percent.

4. The composite electrode of claim 1, wherein said battery has a discharge capacity from about 275 mAh g$^{-1}$ to about 310 mAh g$^{-1}$.

5. The composite electrode of claim 1, wherein said battery has a discharge capacity from about 285 mAh g$^{-1}$ to about 305 mAh g$^{-1}$.

6. The composite electrode of claim 1, wherein said battery has a discharge capacity from about 295 mAh g$^{-1}$ to 300 mAh g$^{-1}$.

7. The composite electrode of claim 1, wherein said composite electrode comprises a cathode.

8. The composite electrode of claim 1, wherein said battery is located in a medical device.

9. The composite electrode of claim 1, further comprising carbon.

* * * * *